(12) United States Patent
Sturrock

(10) Patent No.: US 8,123,068 B2
(45) Date of Patent: Feb. 28, 2012

(54) TROPHY COOLER

(76) Inventor: Brandon Sturrock, Orange, TX (US)

( * ) Notice: Subject to any disclaimer, the term of this patent is extended or adjusted under 35 U.S.C. 154(b) by 243 days.

(21) Appl. No.: 12/583,018

(22) Filed: Aug. 13, 2009

(65) Prior Publication Data

US 2011/0036849 A1    Feb. 17, 2011

(51) Int. Cl.
*B65D 21/02* (2006.01)

(52) U.S. Cl. ............. 220/592.2; 220/592.23; 220/254.1; 220/23.88

(58) Field of Classification Search ................ 220/23.8, 220/908, 912.2, 915.2, 254.5, 254.3, 254.1, 220/23.89, 592.2, 592.23, 592.24, 592.26, 220/23.87, 23.88, 23.86; 215/6; 206/219
See application file for complete search history.

(56) References Cited

U.S. PATENT DOCUMENTS

| | | | | |
|---|---|---|---|---|
| 2,949,203 | A * | 8/1960 | Berg | 215/6 |
| 3,315,402 | A * | 4/1967 | Scott et al. | 43/55 |
| 5,137,957 | A * | 8/1992 | Asai et al. | 524/403 |
| 5,323,902 | A * | 6/1994 | Palmer et al. | 206/366 |
| 6,085,927 | A * | 7/2000 | Kusz | 220/23.87 |
| 6,508,368 | B1 * | 1/2003 | Arce, Jr. | 211/41.3 |
| 7,017,773 | B2 * | 3/2006 | Gruber et al. | 220/675 |
| 7,114,629 | B2 * | 10/2006 | Panek, Jr. | 220/345.1 |
| 2006/0266690 | A1 * | 11/2006 | Adams | 210/259 |

* cited by examiner

*Primary Examiner* — Stephen Castellano
(74) *Attorney, Agent, or Firm* — Benjamin Aaron Adler

(57) ABSTRACT

A trophy cooler is provided, that is easy to transport and provides adequate separation of meat, skin and trophy-head while providing sufficient cooling. The trophy-cooler comprises a chamber comprising an inner wall of insulatory material. The trophy cooler further comprises one or more containers removably attached to an inner wall of the chamber. A removable lid is affixed to the top of the chamber, wherein said lid comprises means of opening one or more parts of the lid. A flexible sheet is removably affixed to the bottom of said lid, wherein said sheet comprises at least one slit.

13 Claims, 4 Drawing Sheets

TROPHY COOLER

BACKGROUND OF THE INVENTION

1. Field of the Invention

The present invention relates to an apparatus for collecting and carrying harvested game. Particularly, this invention relates to a cooler that can enable proper cooling and mutually separate storage of the trophy-head, skin and meat.

2. Description of the Related Art

Millions of people in the United States and abroad hunt wild game, such as deer, antelope, elk, wild hogs and turkeys. Often the hunting is carried out in mountainous or forested terrain. Once an animal has been successfully harvested, the majority of hunters transport the animal out of the wild where it can be processed, both for its meat and as a trophy. Many trophy game specimens are ruined every year due to the lack of proper field care and/or the wrong and incorrect type of field care. It is very important to freeze the trophy, skin and meat immediately in order to prevent contamination and spoilage. Various mobile devices are known that can aid in freezing and transportation of the animal. However, such known devices generally comprise a wheeled cooler typically used for transporting perishable items, such as food and beverages. Such coolers are often cumbersome and very uncomfortable to carry to remote areas. Additionally, the design of such coolers does not provide proper separation of meat, head and skin, which is essential to minimize contamination of meat and spoilage of skin. The coolers are also not designed to accommodate heads of animals with antlers and thus result in insufficient cooling and eventual loss of the trophy during transportation.

One of the known devices is disclosed in U.S. Pat. No. 6,474,097 to Treppedi et al. The mobile carrying device of Treppedi comprises a cooler that includes ski runners and wheels in combination to aid in mobility of the cooler. It also includes an extendable, pivoting handle that may be retracted and stored adjacent the cooler. Cargo nets are attached to the top and side of the cooler for storage of supplies such as towels, plates and cups. The mobile cooler also includes a retainer attached to a side of the cooler for holding an umbrella.

Another known device is disclosed in U.S. Pat. No. 6,176,499 to Conrado. The mobile carrying device of Conrado is a mobile cooler that includes a cooler body with wheels and a pivoted towing handle having two grips for users of varying heights. The underside of the cooler lid has a recess with a cover panel for storing items separately from other items in the cooler. The cooler includes a table assembly operable independently of the cooler lid so that the table may be utilized whether the lid is open or closed. The cooler also includes retractable bungee cords for securing items to the cooler.

Yet another known device is disclosed in U.S. Pat. No. 7,559,559 to Vanderberg, et al. The device of Vanderberg has a wheeled platform and an insulated container, configured to be selectively coupled to and uncoupled from the wheeled platform. The wheeled platform comprises a base and a plurality of wheels mounted to the base for rolling movement of the platform. The base includes a portion that extends beyond at least one of the sidewalls to define a cargo receiving area for receiving items for transport. Additionally, or alternatively, an arm member is mounted to the base and configured to move between a retracted position to define a cargo receiving area and a protracted position substantially eliminating the cargo receiving area.

The devices of Treppedi, Conrado and Vanderberg are exemplary of the shortcomings of the known devices previously discussed herein. Specifically, these devices do not provide sufficient separation of meat, skin and head of the animal. The devices also do not have design adaptations to accommodate heads of animals with antlers and thus result in insufficient cooling and eventual loss of the trophy during transportation.

Accordingly, the art is deficient in a cooler that is easy to transport and provides adequate separation of meat, skin and trophy-head while providing sufficient insulation and cooling. The instant invention overcomes this deficiency in the art.

SUMMARY OF THE INVENTION

In view of the disadvantages inherent in the known types of portable cooler apparatus now present in the prior art, the present invention provides a trophy cooler that is easy to transport and provides adequate separation of meat, skin and trophy-head while providing sufficient cooling.

The invention comprises a chamber comprising an inner wall of insulatory material; one or more containers removably attached to an inner wall of the chamber; a removable lid affixed to the top of said chamber, wherein said lid comprises means of opening one or more parts of said lid; and a flexible sheet affixed to the bottom of said lid, wherein said sheet comprises at least one slit.

Another embodiment of the invention comprises an outer chamber comprising an inner wall of insulatory material and a removable inner chamber comprising One or more removable containers are attached to an inner wall of said inner chamber. A removable lid affixed to the top of the outer chamber, wherein said lid comprises means of opening one or more parts of said lid; and a flexible sheet is affixed to the bottom of said lid, wherein said sheet comprises at least one slit.

A preferred embodiment of the invention comprises a trophy cooler comprising: an outer chamber comprising an inner wall of insulatory material; a removable inner chamber; one or more removable containers attached to an inner wall of said inner chamber; a removable lid affixed to the top of said chamber, wherein said lid comprises means of opening one or more parts of said lid; a flexible sheet affixed to the bottom of said lid, wherein said sheet comprises at least one slit; one or more removable receptacles fastened on one or more external surfaces of said outer chamber; one or more sets of wheels attached to the external lower surface of said outer chamber; and one or more handles attached to one or more external surfaces of said outer chamber.

One of the primary objects of the present invention is to provide a trophy cooler that is easy to transport and provides adequate separation of meat, skin and trophy-head while providing sufficient cooling.

Another object of the present invention is to provide a trophy cooler specifically designed to accommodate heads of animals with antlers.

Still another object of the present invention is to provide a trophy cooler that facilitates proper freezing and storage of the animal skin by preventing the contact of skin with water or blood, thus minimizing skin damage during transportation.

Yet another object of the present invention is to provide an assembly comprising a cooler, knife sheaths, salt containers and containers for antibiotics, thus providing a portable unit for field dressing the animal after successful harvest.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

DETAILED DESCRIPTION OF THE INVENTION

As used herein the specification, "a" or "an" may mean one or more. As used herein in the claim(s), when used in conjunction with the word "comprising", the words "a" or "an" may mean one or more than one. As used herein "another" or "other" may mean at least a second or more of the same or different claim element or components thereof. Furthermore, unless otherwise required by context, singular terms shall include pluralities and plural terms shall include the singular.

As used herein, the term "or" in the claims is used to mean "and/or" unless explicitly indicated to refer to alternatives only or the alternatives are mutually exclusive, although the disclosure supports a definition that refers to only alternatives and "and/or."

A trophy cooler, generally designated 1 (FIGS. 1, 2A-B, 3) is provided. Such a trophy cooler 1 includes a chamber 2 (FIGS. 1, 2A-B, 3) comprising an inner wall comprising an insulatory material. In currently preferred embodiments, the chamber is made of a material selected from the group consisting of aluminum, plastic, titanium or combinations thereof.

Figure 2A:
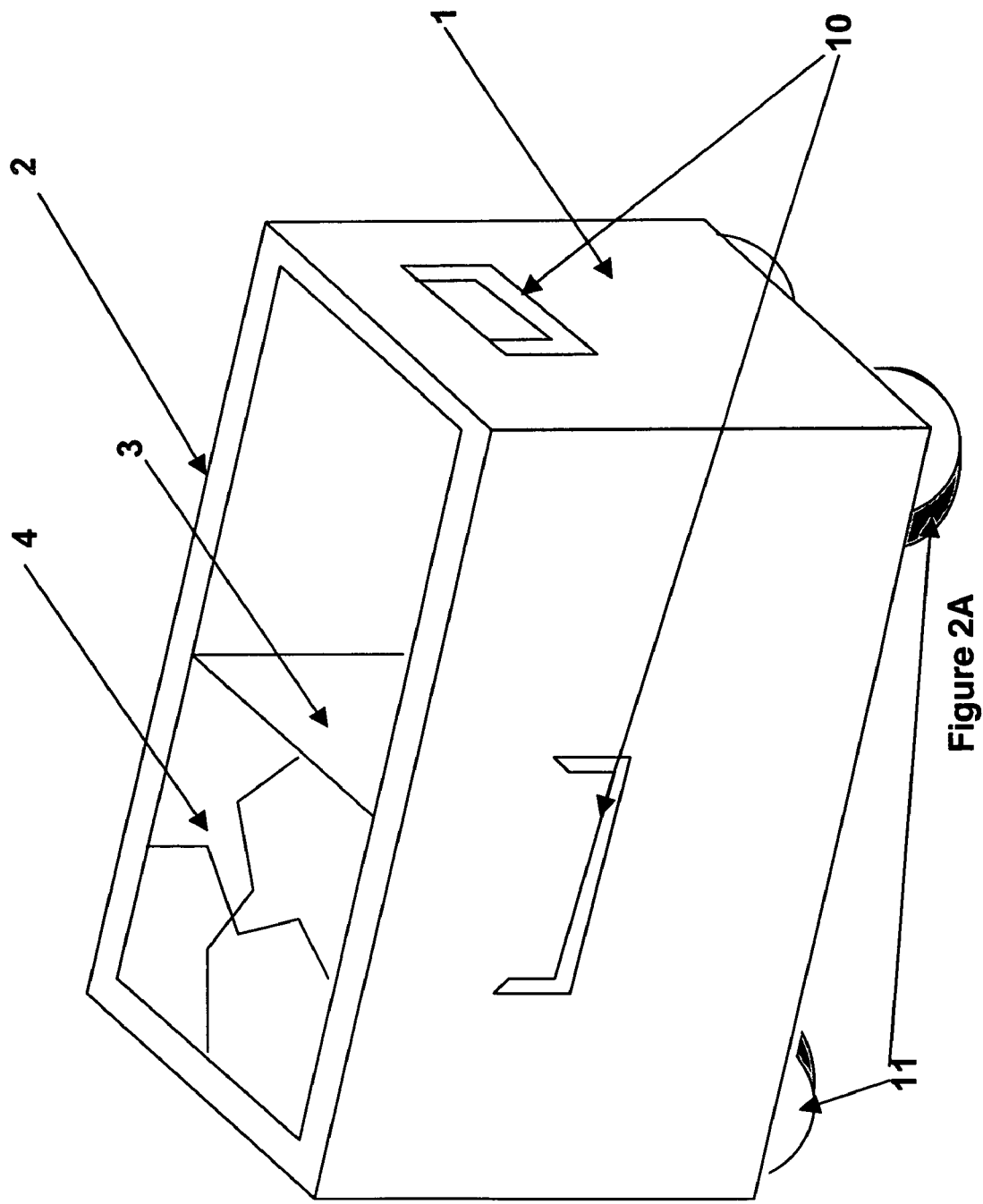
FIG. 2A-2B are partial perspective views of part of the invention according to a first embodiment of the invention.
Figure 3:
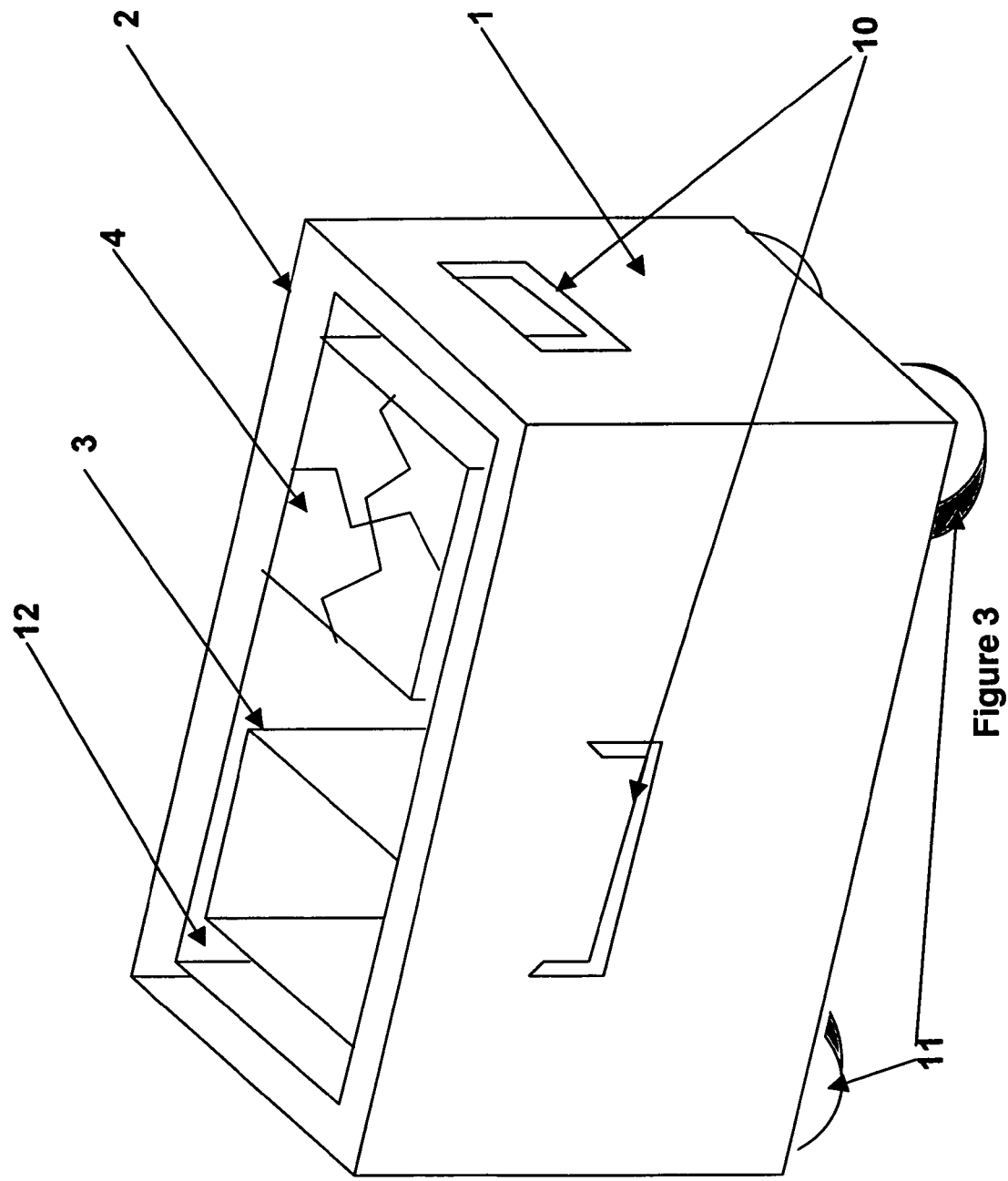
FIG. 3 is a partial perspective view of the invention according to a first embodiment of the invention.

In the presently preferred embodiment, trophy cooler 1 further comprises one or more containers 3 removably attached to an inner wall of the chamber 2 (FIGS. 2A, 3). In currently preferred embodiments, the containers are made of a material selected from the group consisting of aluminum, plastic or a fabric comprising nylon, polyvinyl fluoride, polytetrafluoroethylene and mixtures or combinations thereof. In certain embodiments, the inner surfaces of the chamber and containers are impregnated with an antibacterial agent that prevents contamination of meat, skin and trophy-head.

Figure 1:
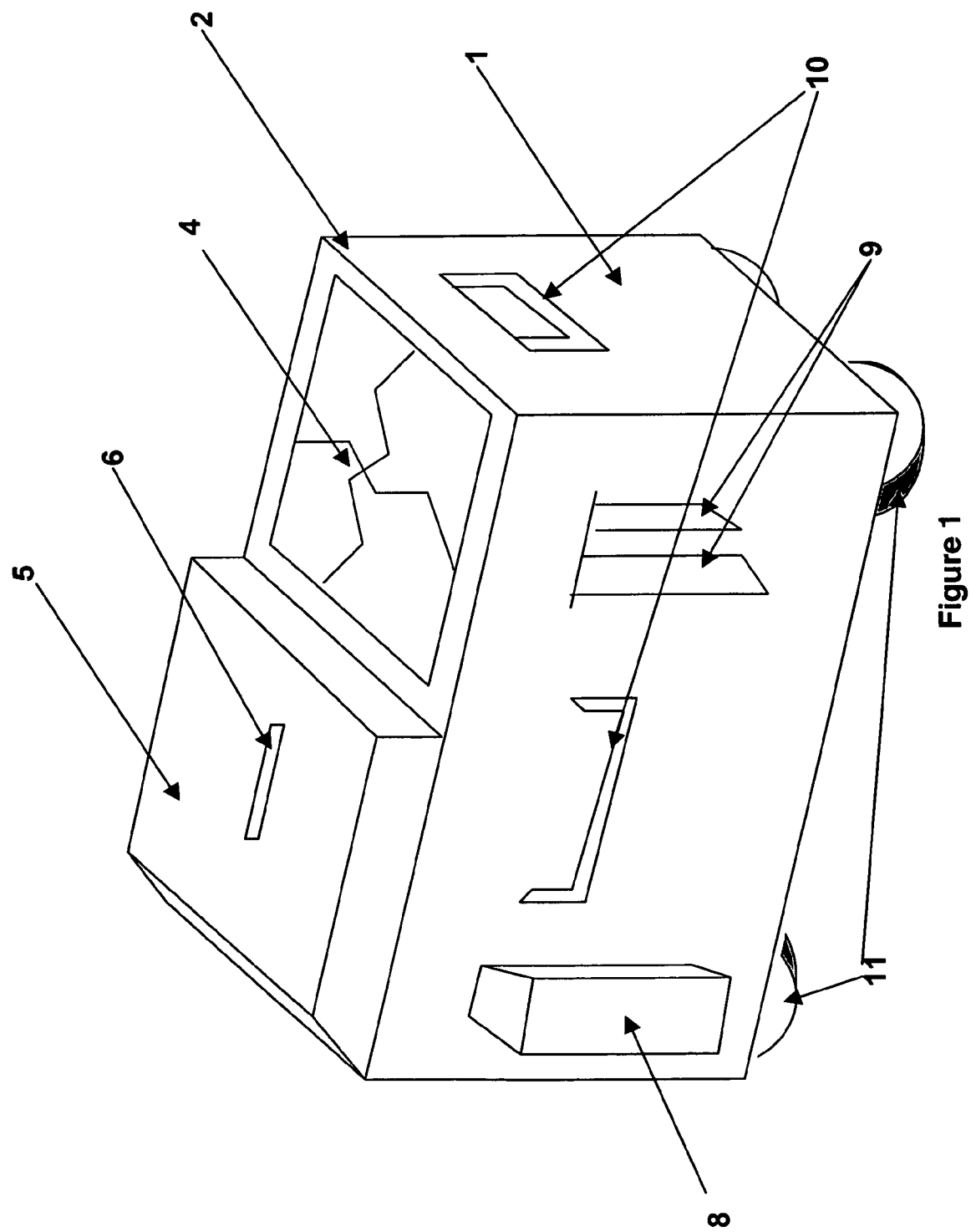
FIG. 1 is a partial perspective view of the invention according to a first embodiment of the invention.
Figure 2B:
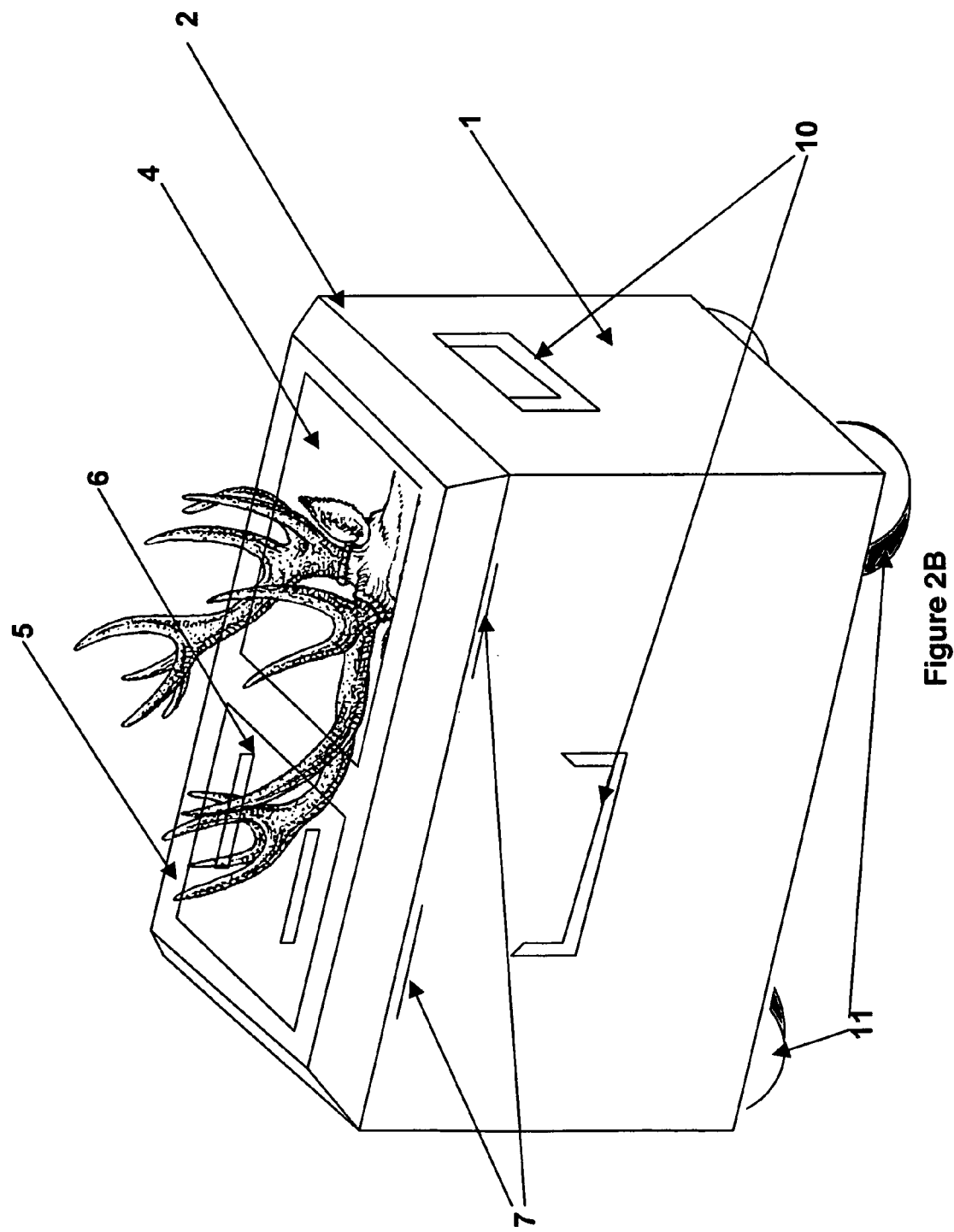

In the presently preferred embodiment, trophy cooler 1 further comprises a removable lid 5 affixed to the top of the chamber 2 (FIGS. 1, 2B). In preferred embodiments, the lid is made of a material selected from the group consisting of aluminum, plastic or titanium. In some embodiments, the lid 5 is attached to the chamber by means of hinges 7 (FIG. 2B). In some other embodiments, the lid 5 is completely removable. In all embodiments, the lid 5 comprises means 6 of opening one or more parts of the lid (FIGS. 1, 2B). In certain embodiments, one side of this means 6 of opening is attached to the lid by means of one or more hinges.

In preferred embodiments, a flexible sheet 4 is removably affixed to the bottom of the lid 5 (FIGS. 1, 2A-B, 3). The flexible sheet 4 comprises at least one slit to receive an object. In certain embodiments of the trophy cooler 1, the sheet may comprise up to four slits that frictionally embrace and retain an object (FIG. 2B). Additionally, the sheet 4 may have a thickness of about 0.5 inches to about 3 inches. In preferred embodiments, the sheet 4 is made of a material selected from the group consisting of elastomers, polyethylene foam and polystyrene foam.

In certain embodiments, the trophy cooler 1 comprises one or more removable receptacles 8, fastened on one or more external surfaces of the chamber 2 (FIG. 1). In some embodiments of the instant invention, one or more of these receptacles is a sheath 9, for storing knives or other utensils (FIG. 1).

In some embodiments, the trophy cooler 1 comprises one or more handles 10 attached to one or more external surfaces of the chamber 2 (FIGS. 1, 2A-B, 3). In some of these embodiments, the handles further comprise indentations for receiving fingers. In some embodiments of the instant invention, the handle further comprises a grip manufactured from rubber, industrial foam or plastic.

Certain embodiments of the instant invention may comprise one or more sets of wheels 11, attached to the external lower surface of said outer chamber (FIGS. 1, 2A-B, 3).

One preferred embodiment of the trophy cooler 1 comprises an outer chamber 2 comprising an inner wall of insulatory material; a removable inner chamber 12 comprising dimensions smaller than outer chamber (FIG. 3). One or more removable containers 3 are attached to an inner wall of said inner chamber (FIG. 3). A removable lid 5 is affixed to the top of the chamber, wherein said lid comprises means 6 of opening one or more parts of said lid and a flexible sheet 4 is removably affixed to the bottom of said lid, wherein said sheet comprises at least one slit (FIG. 3). In certain embodiments, the inner chamber is permanently affixed.

Another preferred embodiment of the instant invention comprises a trophy cooler comprising: an outer chamber comprising an inner wall of insulatory material; a removable inner chamber; one or more removable containers attached to an inner wall of said inner chamber; a removable lid affixed to the top of said chamber, wherein said lid comprises means of opening one or more parts of said lid; a flexible sheet removably affixed to the bottom of said lid, wherein said sheet comprises at least one slit; one or more removable receptacles fastened on one or more external surfaces of said outer chamber; one or more sets of wheels attached to the external lower surface of said outer chamber; and one or more handles attached to one or more external surfaces of said outer chamber.

In certain embodiments of the instant invention, the trophy cooler comprises a chamber comprising an inner length of about 30 inches to about 50 inches, an inner width of about 15 inches to about 30 inches and an inner height of about 20 inches to about 30 inches. In some of these embodiments, the containers comprise an inner length of about 10 inches to about 18 inches, an inner width of about 5 inches to about 18 inches and an inner height of about 5 inches to about 25 inches.

While presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

What is claimed is:

1. A trophy cooler comprising:
   a chamber with an inner length of about 30 inches to about 50 inches, an inner width of about 15 inches to about 30 inches and an inner height of about 20 inches to about 30 inches, said chamber comprising an inner wall of insulatory material;

one or more containers removably attached to an inner wall of said chamber wherein the containers comprise an inner length of about 10 inches to about 18 inches, an inner width of about 5 inches to about 18 inches and an inner height of about 5 inches to about 25 inches;

a removable lid affixed to the top of said chamber; and a flexible sheet removably affixed to the bottom of said lid, wherein said sheet comprises at feast one slit.

2. A trophy cooler according to claim 1 wherein said chamber is made of a material selected from the group consisting of aluminum, plastic, titanium or combinations thereof.

3. A trophy cooler according to claim 1 wherein said container is made of a material selected from the group consisting of aluminum, plastic or a fabric comprising nylon, polyvinyl fluoride, polytetrafluoroethylene and mixtures or combinations thereof.

4. A trophy cooler according to claim 1 wherein inner surfaces of said chamber and said containers are impregnated with an antibacterial agent.

5. A trophy cooler according to claim 1 wherein said lid is made of a material selected from the group consisting of aluminum, plastic or titanium.

6. A trophy cooler according to claim 1 wherein said sheet is made of a material selected from the group consisting of elastomers, polyethylene foam and polystyrene foam.

7. A trophy cooler according to claim 1 wherein said sheet has a thickness of about 0.5 inches to about 3 inches.

8. A trophy cooler according to claim 1 wherein said sheet comprises one to four slits that frictionally embrace and retain an object.

9. A trophy cooler according to claim 1, comprising one or more removable receptacles fastened on one or more external surfaces of said chamber.

10. A trophy cooler according to claim 1, wherein one or more receptacles are sheaths for storing knives.

11. A trophy cooler according to claim 1 further comprising one or more sets of wheels attached to the external lower surface of said chamber.

12. A trophy cooler according to claim 1 further comprising one or more handles attached to one or more external surfaces of said chamber.

13. A trophy cooler according to claim 1 wherein said handle further comprises a grip manufactured from rubber, industrial foam or plastic.

* * * * *